United States Patent
Liu et al.

(10) Patent No.: US 10,171,834 B2
(45) Date of Patent: Jan. 1, 2019

(54) METHODS AND APPARATUS FOR INTRA PICTURE BLOCK COPY IN VIDEO COMPRESSION

(71) Applicant: MEDIATEK INC., Hsinchu (TW)

(72) Inventors: Shan Liu, San Jose, CA (US); Xiaozhong Xu, Fremont, CA (US); Karen Yun Chang, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 105 days.

(21) Appl. No.: 15/031,878

(22) PCT Filed: Dec. 1, 2014

(86) PCT No.: PCT/CN2014/092713
§ 371 (c)(1),
(2) Date: Apr. 25, 2016

(87) PCT Pub. No.: WO2015/078420
PCT Pub. Date: Jun. 4, 2015

(65) Prior Publication Data
US 2016/0269746 A1    Sep. 15, 2016

Related U.S. Application Data

(60) Provisional application No. 61/910,134, filed on Nov. 29, 2013.

(51) Int. Cl.
*H04N 11/02* (2006.01)
*H04N 19/593* (2014.01)
(Continued)

(52) U.S. Cl.
CPC ........... *H04N 19/593* (2014.11); *H04N 19/11* (2014.11); *H04N 19/139* (2014.11);
(Continued)

(58) Field of Classification Search
CPC .................................................... H04N 19/593
(Continued)

(56) References Cited

U.S. PATENT DOCUMENTS

| | | | |
|---|---|---|---|
| 4,754,492 A * | 6/1988 | Malvar | H04N 19/86 375/240.2 |
| 5,333,211 A * | 7/1994 | Kanda | G06T 9/007 358/3.06 |

(Continued)

FOREIGN PATENT DOCUMENTS

| | | |
|---|---|---|
| CN | 101222636 | 7/2008 |
| CN | 103366340 | 10/2013 |
| WO | WO 2008/075256 | 6/2008 |

OTHER PUBLICATIONS

International Search Report dated Feb. 27, 2015, issued in application No. PCT/CN2014/092713.

*Primary Examiner* — Leron Beck
(74) *Attorney, Agent, or Firm* — Oblon, McClelland, Maier & Neustadt, L.L.P.

(57) ABSTRACT

Implementations of techniques of intra picture block copy in video compression are described. In one example implementation, a method may include: identifying a first block of pixels of a plurality of pixels of a picture as a reference block for reconstructing a second block of pixels of the plurality of pixels of the picture; determining an overlapped region of the second block that overlaps with the first block; and reconstructing pixels in the overlapped region based on a first set of pixels and a second set of pixels of the first block.

17 Claims, 12 Drawing Sheets

(51) Int. Cl.
*H04N 19/139* (2014.01)
*H04N 19/176* (2014.01)
*H04N 19/11* (2014.01)
*H04N 19/583* (2014.01)
*H04N 19/182* (2014.01)
*H04N 19/172* (2014.01)

(52) U.S. Cl.
CPC ......... *H04N 19/176* (2014.11); *H04N 19/182* (2014.11); *H04N 19/583* (2014.11); *H04N 19/172* (2014.11)

(58) Field of Classification Search
USPC ............................................... 375/240.02–29
See application file for complete search history.

(56) References Cited

U.S. PATENT DOCUMENTS

| | | | |
|---|---|---|---|
| 6,128,416 A * | 10/2000 | Oura | H04N 1/3876 348/239 |
| 9,503,728 B2 * | 11/2016 | Mochizuki | H04N 19/61 |
| 2006/0140277 A1 * | 6/2006 | Ju | H04N 19/44 375/240.25 |
| 2011/0200097 A1 | 8/2011 | Chen et al. | |
| 2011/0200111 A1 * | 8/2011 | Chen | H04N 19/52 375/240.16 |
| 2012/0195515 A1 * | 8/2012 | Ikai | H04N 19/176 382/238 |
| 2015/0071357 A1 * | 3/2015 | Pang | H04N 19/563 375/240.16 |

\* cited by examiner

METHODS AND APPARATUS FOR INTRA PICTURE BLOCK COPY IN VIDEO COMPRESSION

CROSS REFERENCE TO RELATED APPLICATIONS

This is a non-provisional patent application claiming the priority benefit of provisional patent application Ser. No. 61/910,134, filed on 29 Nov. 2013, which is incorporated by reference in its entirety.

TECHNICAL FIELD

Implementations of the present disclosure are generally related to video compression and, more particularly, to video compression using intra picture block copy.

BACKGROUND

Unless otherwise indicated herein, approaches described in this section are not prior art to the claims listed below and are not admitted to be prior art by inclusion in this section.

Video compression is becoming important because of the increasing popularity of a wide variety of video-related applications such as streaming media, wireless display, remote gaming, cloud computing, distance learning, and so forth. Video in these applications often has a mixed content including natural video, text and still graphics in the same picture.

The High Efficiency Video Coding (HEVC) standard, a successor to the Advanced Video Coding (AVC) standard, was finalized in January of 2013. Investigations on several extensions of HEVC had started prior to the finalization of the HEVC standard. Range extension (RExt) is one of the extensions under investigation, which aims at providing solutions for efficiently compressing video contents of higher bit-depths, e.g., 10, 12, 14, 16, and color formats other than the YUV420 color format, such as YU422, YUV444 and RGB444.

During the investigation of RExt, some video coding tools have been studied, including the intra picture block copy (IntraBC) technique. IntraBC is a block matching technique in which a coding unit (CU) is predicted as a displacement from an already-reconstructed block of samples in a neighboring region of the same picture. IntraBC is effective for screen content video since it removes redundancy from repeating patterns which typically occur in regions text and/or still graphics in the picture.

Referring to FIG. 10, in a first approach, for the CUs using intra motion compensation (MC), the reference block is obtained from a reconstructed region in the same picture, and, then, motion vectors (MVs) and residual are coded. In this approach, the intra MC differs from the inter-picture case of HEVC in a number of ways. Firstly, MVs are restricted to one-dimensional (1-D), i.e., either horizontal or vertical, instead of being two-dimensional (2-D). Additionally, binarization is fixed length instead of exponential-Golomb. Moreover, a new syntax element is introduced to signal whether the MV is horizontal or vertical.

In a second approach, intra MC is extended to support 2-D MVs, so that both MV components can be non-zero at the same time (as in the inter-picture case of HEVC). This provides more flexibility to intra MC than in the first approach where the MV is restricted to be strictly horizontal or vertical. The second approach adopts 2-D intra MC and removes interpolation filters. The second approach also constrains the search area to the current coding tree unit (CTU) and the left CTU.

In the IntraBC technique in the first and second approaches, all the samples in the reference block need to be reconstructed samples. Because of this requirement, the reference block cannot overlap with the current CU. A third approach extends the current Intra BC method such that the overlapping between the current and the reference blocks is allowed. Referring to FIG. 11, DVx and DVy denote the horizontal and the vertical components of a displacement vector (DV), and W and H denote the width and the height of the current CU. When the reference block is overlapped with the current CU, the left and top parts of the reference block are available, as shown in FIG. 11. The unavailable part is padded by horizontally copying the nearest available reconstructed sample in the reference block.

In a fourth approach, when the current CU to be predicted overlaps the reference CU, the prediction samples in the overlapped region are generated by copying the available samples from either the vertical or horizontal direction. Referring to FIG. 12, when $|MVy|>|MVx|$, the reference samples are generated by copying the reference samples of the bottommost row of the above CU. Otherwise, when $|MVy|\le|MVx|$, the reference samples are generated by copying the reference samples of the rightmost column of the left CU. Similar to the third approach, the padding process of the fourth approach is invoked when $(-W<MVx\le0)$ and $(-H<MVy\le0)$, where W and H are the width and height of the current block, and MVx and MVy are the horizontal and vertical element of the MV.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide new approaches and techniques of padding for IntraBC in video compression when there is an overlap between a reference block and a current to-be-predicted block.

In one example implementation, a method implementable in a video compression device may involve the device identifying a first block of pixels of a plurality of pixels of a picture as a reference block for reconstructing a second block of pixels of the plurality of pixels of the picture. The method may also involve the device determining an overlapped region of the second block that overlaps with the first block. The method may further involve the device reconstructing pixels in the overlapped region based on a first set of pixels of the first block and a second set of pixels of the first block, wherein the second set of pixels of the first block is different from the first set of pixels of the first block. In an embodiment, the first set of pixels of the first block is adjacent to a first side of the overlapped region and the second set of pixels of the first block is adjacent to a second side of the overlapped region.

In another example implementation, a video compression device may include a memory and a processor coupled to the memory. The memory may be configured to store data related to a plurality of pixels of a picture. The processor may be configured to store the data in and access the data from the memory. The processor may include a determination unit and a reconstruction unit. The determination unit may be configured to identify a first block of pixels of the plurality of pixels of the picture as a reference block for reconstructing a second block of pixels of the plurality of pixels of the picture, the determination unit further configured to determine an overlapped region of the second block that overlaps with the first block. The reconstruction unit may be configured to reconstruct pixels in the overlapped region based on a first set of pixels of the first block and a second set of pixels of the first block.

Advantageously, by reconstructing the overlapped region based on different pixels of a reference block, pixels of the overlapped region of the current to-be-predicted block of pixels may better blend in with surrounding pixels. This provides a more granular approach to reconstructing pixels in the to-be-predicted block of pixels compared to existing approaches described above.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION

Overview

The present disclosure provides several novel and non-obvious implementations of new approaches and techniques of padding for IntraBC in video compression when there is an overlap between a reference block and a current to-be-predicted block. Description of an overview of various implementations of the present disclosure is provided below with reference to FIG. 1-FIG. 7.

It is noteworthy that, although each of the examples described and illustrated herein pertains to a scenario in which a reference block is located to the left and above the current to-be-predicted block, implementations of the present disclosure are equally applicable to other scenarios in which the orientation between the reference block and the current to-be-predicted block is different. For example, implementations of the present disclosure are also applicable to scenarios in which the reference block is located to the right and above the current to-be-predicted block. Similarly, implementations of the present disclosure are also applicable to scenarios in which the reference block is located to the left and below the current to-be-predicted block. Likewise, implementations of the present disclosure are also applicable to scenarios in which the reference block is located to the right and below the current to-be-predicted block.

Moreover, although each of the examples described and illustrated herein pertains to a scenario in which the overlapped region is not split, or is split or otherwise divided into two portions, implementations of the present disclosure are also applicable to other scenarios in which the overlapped region is split or otherwise divided into more than two portions (e.g., three or four portions). Thus, for simplicity and to aid better appreciation of implementations of the present disclosure, examples described and illustrated herein are directed to scenarios in which the overlapped region is split or otherwise divided into two portions.

Figure 1:
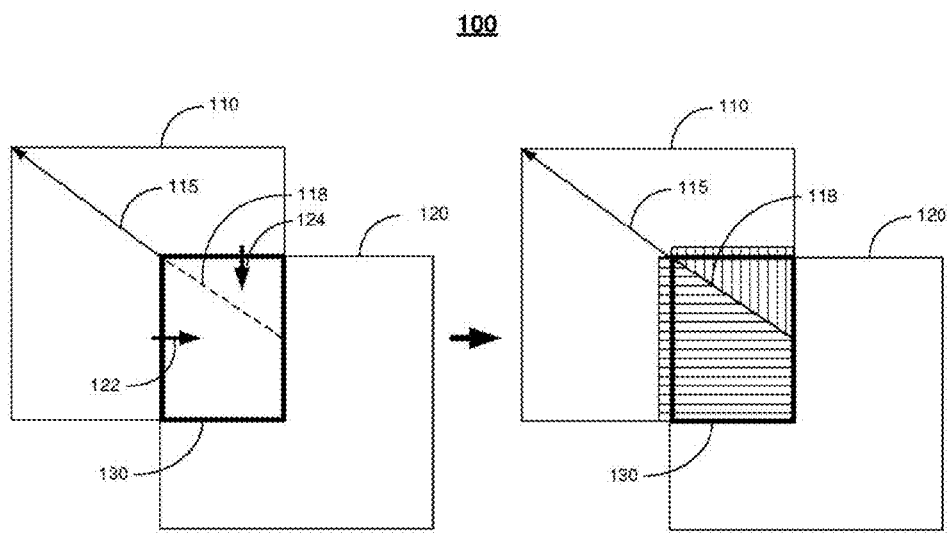
FIG. 1 is a diagram illustrating an exemplary approach of padding for IntraBC in video compression in accordance with an implementation of the present disclosure.

FIG. 1 is a diagram illustrating an example approach 100 of padding for IntraBC in video compression in accordance with an implementation of the present disclosure.

Figure 10:
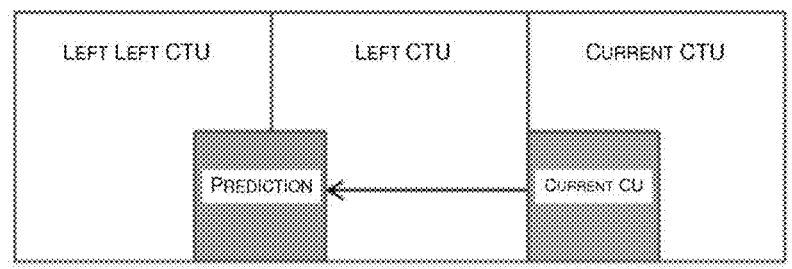
FIG. 10 is a diagram illustrating intra MC in accordance with an existing approach.
Figure 11:
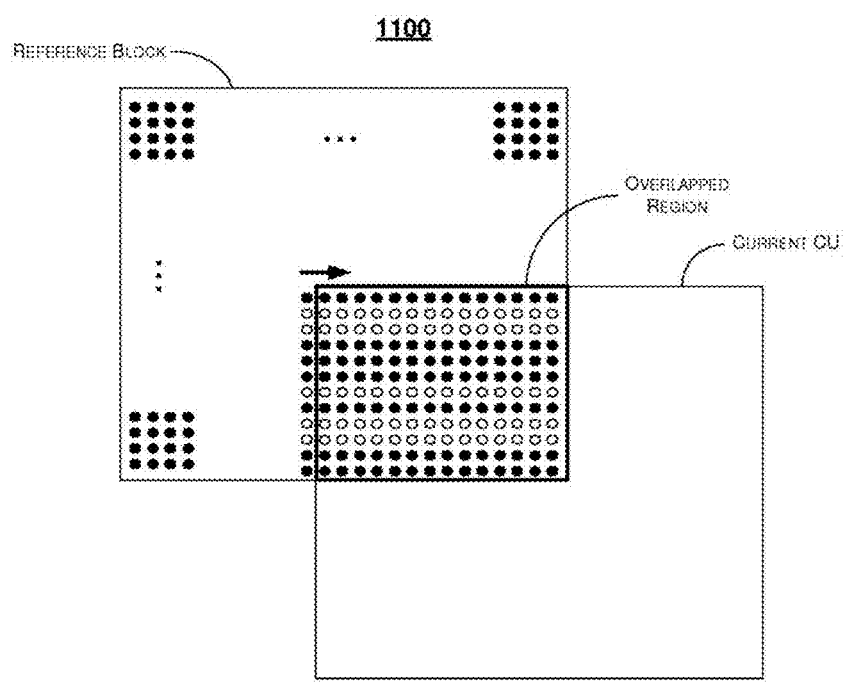
FIG. 11 is a diagram illustrating IntraBC with padding in accordance with an existing approach.
Figure 12:
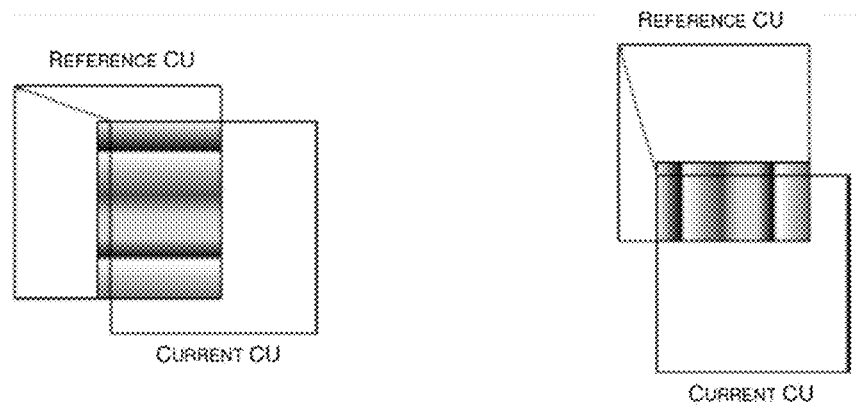
FIG. 12 is a diagram illustrating IntraBC with padding in accordance with another existing approach.

In example approach 100, reference block 110 is a block of pixels in a picture that has been identified and used as a reference for padding or otherwise reconstruction of a current to-be-predicted block 120 of pixels in the picture. Reference block 120 has an overlapped region 130 that overlaps with a portion of reference block 110. A block vector (BV) 115 indicates a spatial relationship between reference block 110 and current block 120. BV 115 is equivalent to the motion vector (MV) in existing approaches such as those shown in FIG. 10 and FIG. 12. In the example shown in FIG. 1, BV 115 points from the upper-left corner of the overlapped region 130 to the upper-left corner of reference block 110.

In exemplary approach 100, overlapped region 130 may be split or otherwise divided into two portions—a lower-left portion and an upper-right portion—by a line 118 which is an extension or extrapolation of BV 115. That is, in the example shown in FIG. 1, line 118 is parallel to BV 115 and extends from the upper-left corner of overlapped region 130 to an intersection point on the right side of overlapped region 130.

In some implementations, pixels in the lower-left portion of overlapped region 130 may be generated by copying or otherwise duplicating reference sample pixels of the rightmost column of pixels of reference block 110 that are immediately adjacent to the lower-left portion of overlapped region 130. As shown in FIG. 1, reference sample pixels of the right-most column of pixels of reference block 110 that are immediately adjacent to the lower-left portion of overlapped region 130 are duplicated in a rightward direction 122 to generate, pad or otherwise reconstruct the pixels of the lower-left portion of overlapped region 130.

Similarly, pixels in the upper-right portion of overlapped region 130 may be generated by copying or otherwise duplicating reference sample pixels of the bottom-most row of pixels of reference block 110 that are immediately adjacent to the upper-right portion of overlapped region 130. As shown in FIG. 1, reference sample pixels of the bottom-most row of pixels of reference block 110 that are immediately adjacent to the upper-right portion of overlapped region 130 are duplicated in a downward direction 124 to generate, pad or otherwise reconstruct the pixels of the upper-right portion of overlapped region 130.

As a result, as shown in FIG. 1, pixels in the lower-left portion of overlapped region 130 may have the same pattern as that of the reference sample pixels of the right-most column of pixels of reference block 110 that are immediately adjacent to the lower-left portion of overlapped region 130. Likewise, pixels in the upper-right portion of overlapped region 130 may have the same pattern as that of the reference sample pixels of the bottom-most row of pixels of reference block 110 that are immediately adjacent to the upper-right portion of overlapped region 130.

For illustrative purpose and not limiting the scope of implementations of the present disclosure, an exemplary pseudo-code of an example implementation is provided below. In the exemplary pseudo-code, the height of the overlapped region (e.g., overlapped region 130) is denoted as "height", the width of the overlapped region is denoted as "width", ref(x,y) denotes the reference sample pixel at position (x,y) position to be generated, padded or otherwise reconstructed, ref(x−1, y) denotes the reference sample pixel in the right-most column of the left CU, and ref(x, y−1) denotes the reference sample pixel in the bottom-most row of the above CU.

```
for( y = 0; y < height; y++ )
{
    Calculate splitting point "split(y)";
    for( x = 0; x < split(y); x++ )
        ref(x,y) = ref(x_−1, y);
    for( x = split(y); x < width; x++ )
        ref(x,y) = ref(x, y_−1);
}
```

In some implementations, the split or division of the overlapped region (e.g., overlapped region 130) may be calculated according to Equation (1) below.

$$\text{floor}\left(\frac{|BVx|}{|BVy|} * y\right) \quad (1)$$

In some alternative implementations, the split or division of the overlapped region may be calculated according to Equation (2) below.

$$\text{floor}\left(\frac{|BVx|}{|BVy|} * y\right) + 1 \quad (2)$$

In some implementations, the padding process may be invoked when the following condition is met: $(-W<BV_x \leq 0)$ AND $(-H<BV_y \leq 0)$. Here, W and H denote the width and height of the current block, respectively, and $BV_x$ and $BV_y$ denote the dimension of the block vector in the X and Y coordinates or directions, respectively.

Figure 2:
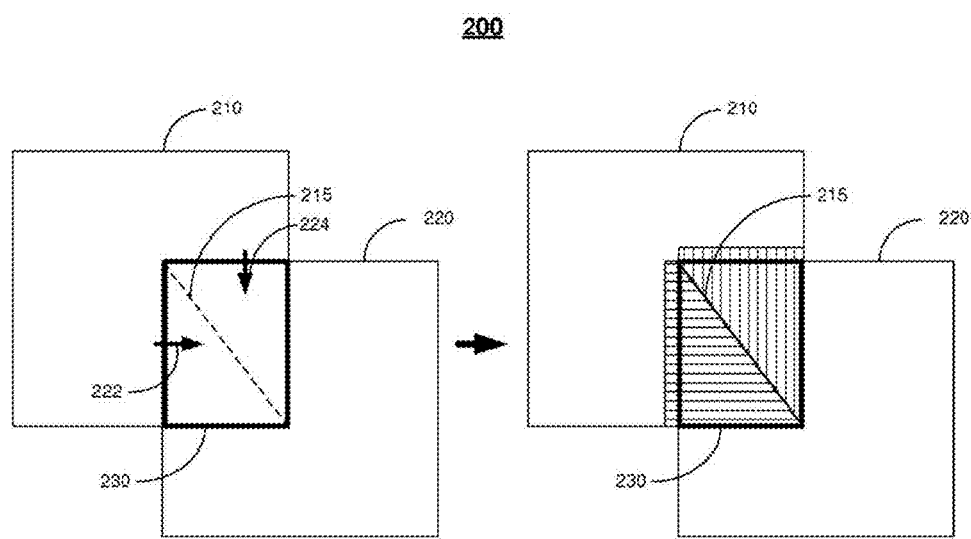
FIG. 2 is a diagram illustrating an exemplary approach of padding for IntraBC in video compression in accordance with another implementation of the present disclosure.

FIG. 2 is a diagram illustrating an exemplary approach 200 of padding for IntraBC in video compression in accordance with another implementation of the present disclosure.

In exemplary approach 200, reference block 210 is a block of pixels in a picture that has been identified and used as a reference for padding or otherwise reconstruction of a current to-be-predicted block 220 of pixels in the picture. Reference block 220 has an overlapped region 230 that overlaps with a portion of reference block 210.

In exemplary approach 200, overlapped region 230 may be split or otherwise divided into two portions—a lower-left portion and an upper-right portion—by a line 215 that diagonally dissects overlapped region 230 from the upper-left corner of overlapped region 230 to the lower-right corner of overlapped region 230 which is diagonal to the upper-left corner thereof.

In some implementations, pixels in the lower-left portion of overlapped region 230 may be generated by copying or otherwise duplicating reference sample pixels of the right-most column of pixels of reference block 210 that are immediately adjacent to the lower-left portion of overlapped region 230. As shown in FIG. 2, reference sample pixels of the right-most column of pixels of reference block 210 that are immediately adjacent to the lower-left portion of overlapped region 230 are duplicated in a rightward direction 222 to generate, pad or otherwise reconstruct the pixels of the lower-left portion of overlapped region 230.

Similarly, pixels in the upper-right portion of overlapped region 230 may be generated by copying or otherwise duplicating reference sample pixels of the bottom-most row of pixels of reference block 210 that are immediately adjacent to the upper-right portion of overlapped region 230. As shown in FIG. 2, reference sample pixels of the bottom-most row of pixels of reference block 210 that are immediately adjacent to the upper-right portion of overlapped region 230 are duplicated in a downward direction 224 to generate, pad or otherwise reconstruct the pixels of the upper-right portion of overlapped region 230.

As a result, as shown in FIG. 2, pixels in the lower-left portion of overlapped region 230 may have the same pattern as that of the reference sample pixels of the right-most column of pixels of reference block 210 that are immediately adjacent to the lower-left portion of overlapped region 230. Likewise, pixels in the upper-right portion of overlapped region 230 may have the same pattern as that of the reference sample pixels of the bottom-most row of pixels of reference block 210 that are immediately adjacent to the upper-right portion of overlapped region 230.

For illustrative purpose and not limiting the scope of implementations of the present disclosure, an exemplary pseudo-code of an example implementation is provided below. In the example pseudo-code, the height of the overlapped region (e.g., overlapped region 230) is denoted as "height", the width of the overlapped region is denoted as "width", ref(x,y) denotes the reference sample pixel at position (x,y) position to be generated, padded or otherwise reconstructed, ref(x−1, y) denotes the reference sample pixel in the right-most column of the left CU, and ref(x, y−1) denotes the reference sample pixel in the bottom-most row of the above CU.

```
for( y = 0; y < height; y++ )
{
    Calculate splitting point "split(y)";
    for( x = 0; x < split(y); x++ )
        ref(x,y) = ref(x_-1, y);
    for( x = split(y); x < width; x++ )
        ref(x,y) = ref(x, y_-1);
}
```

In some implementations, the split or division of the overlapped region (e.g., overlapped region 130) may be calculated according to Equation (3) below.

$$\text{floor}\left(\frac{|\text{width}|}{|\text{height}|} * y\right) \quad (3)$$

In some alternative implementations, the split or division of the overlapped region may be calculated according to Equation (4) below.

$$\text{floor}\left(\frac{|\text{width}|}{|\text{height}|} * y\right) + 1 \quad (4)$$

In some implementations, the padding process may be invoked when the following condition is met: $(-W<BV_x\leq 0)$ AND $(-H<BV_y\leq 0)$. Here, W and H denote the width and height of the current block, respectively, and $BV_x$ and $BV_y$ denote the dimension of the block vector in the X and Y coordinates or directions, respectively.

Figure 3:
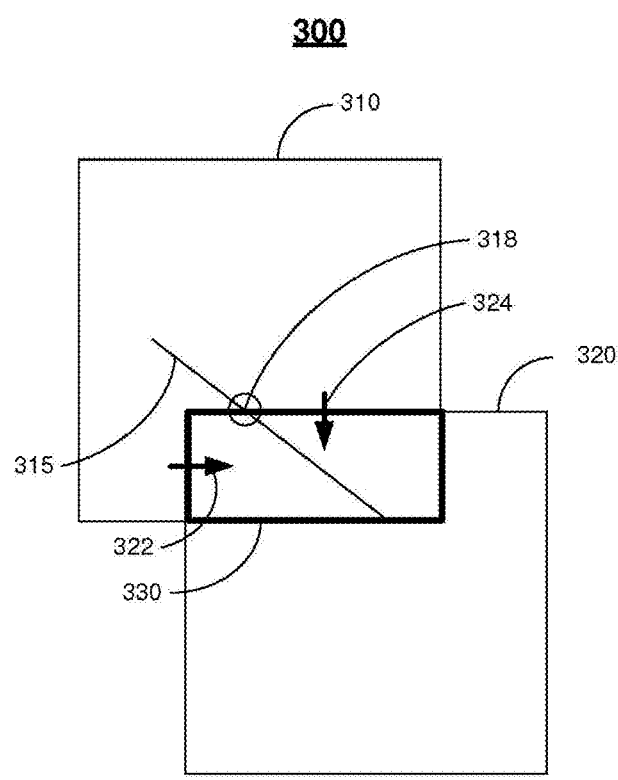
FIG. 3 is a diagram illustrating an exemplary approach of padding for IntraBC in video compression in accordance with yet another implementation of the present disclosure.

FIG. 3 is a diagram illustrating an exemplary approach 300 of padding for IntraBC in video compression in accordance with yet another implementation of the present disclosure.

In exemplary approach 300, reference block 310 is a block of pixels in a picture that has been identified and used as a reference for padding or otherwise reconstruction of a current to-be-predicted block 320 of pixels in the picture. Reference block 320 has an overlapped region 330 that overlaps with a portion of reference block 310.

In example approach 300, overlapped region 330 may be split or otherwise divided into two portions—a lower-left portion and an upper-right portion—by a predetermined line 315 that splits or otherwise divides overlapped region 330 into the lower-left portion and the upper-right portion. The predetermined line 315 may be defined by a splitting direction and an intersection point 318 on a boundary of overlapped region 330 (e.g., the upper boundary). As shown in FIG. 3, the predetermined line 315 divides overlapped region 330 into the lower-left portion and the upper-right portion by extending in the splitting direction and intersecting the upper boundary of overlapped region 330 at intersection point 318.

In some implementations, the splitting direction may be a direction of a block vector, e.g., similar to BV 115 of FIG. 1, that indicates a spatial relationship between reference block 310 and current block 320. Alternatively, the splitting direction may be a direction of a gradient of a number of pixels of reference block 310 in proximity of intersection point 318.

In some implementations, intersection point 318 may be determined in a manner as described below. In the example shown in FIG. 3, for each point on the upper boundary of overlapped region 330 and the left boundary of overlapped region 330 orthogonal to the upper boundary, a pixel difference between every two neighboring pixels of the point may be determined. Next, a point on either the upper boundary or the left boundary of overlapped region 330 is selected or otherwise determined as the intersection point. In the example shown in FIG. 3, the pixel difference for the intersection point 318 is greater than the pixel different for each of other points on the upper and left boundaries of overlapped region 330.

In some other implementations, intersection point 318 may be determined in a manner as described below. In the example shown in FIG. 3, for each point on the upper boundary of overlapped region 330 and the left boundary of overlapped region 330 orthogonal to the upper boundary, a pixel gradient distribution of reconstructed pixels around the point is determined. Next, a point on either the upper boundary or the left boundary of overlapped region 330 is selected or otherwise determined as the intersection point. In the example shown in FIG. 3, a magnitude of the pixel gradient for the intersection point is greater than a magnitude of the pixel gradient for each of other points on the upper and left boundaries of overlapped region 330.

In some implementations, pixels in the lower-left portion of overlapped region 330 may be generated by copying or otherwise duplicating reference sample pixels of the right-most column of pixels of reference block 310 that are immediately adjacent to the lower-left portion of overlapped region 330. As shown in FIG. 3, reference sample pixels of the right-most column of pixels of reference block 310 that are immediately adjacent to the lower-left portion of overlapped region 330 are duplicated in a rightward direction 322 to generate, pad or otherwise reconstruct the pixels of the lower-left portion of overlapped region 330.

Similarly, pixels in the upper-right portion of overlapped region 330 may be generated by copying or otherwise duplicating reference sample pixels of the bottom-most row of pixels of reference block 310 that are immediately adjacent to the upper-right portion of overlapped region 330. As shown in FIG. 3, reference sample pixels of the bottom-most row of pixels of reference block 310 that are immediately adjacent to the upper-right portion of overlapped region 330 are duplicated in a downward direction 324 to generate, pad or otherwise reconstruct the pixels of the upper-right portion of overlapped region 330.

Figure 4:
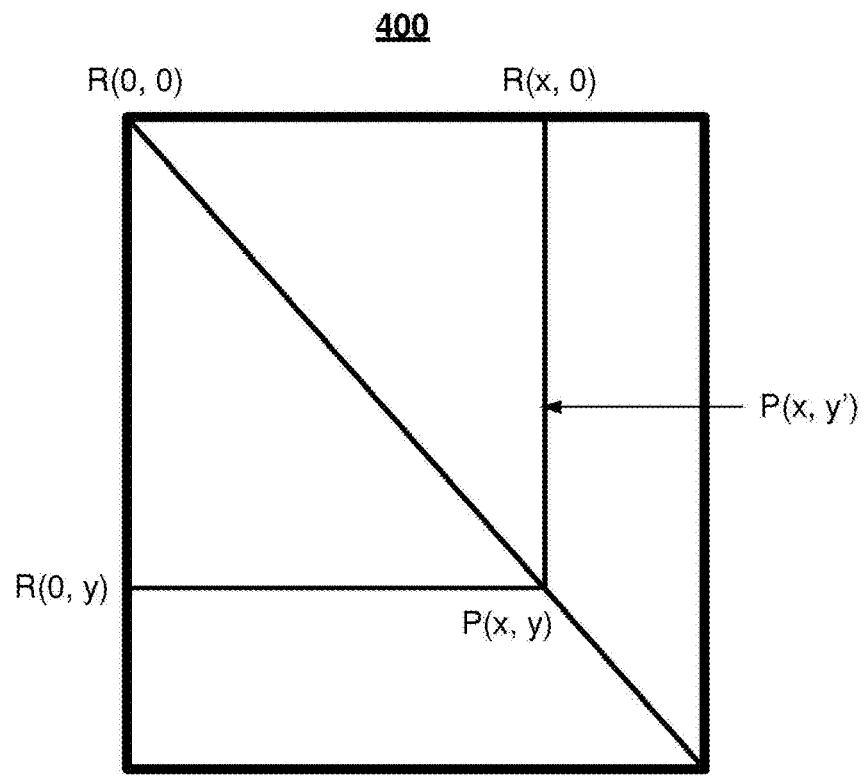
FIG. 4 is a diagram illustrating an exemplary approach of padding for IntraBC in video compression in accordance with still another implementation of the present disclosure.

FIG. 4 is a diagram illustrating an exemplary approach 400 of padding for IntraBC in video compression in accordance with still another implementation of the present disclosure.

In exemplary approaches 100, 200 and 300, values of the padded pixels in the overlapped region may change along the horizontal or vertical direction.

Figure 5:
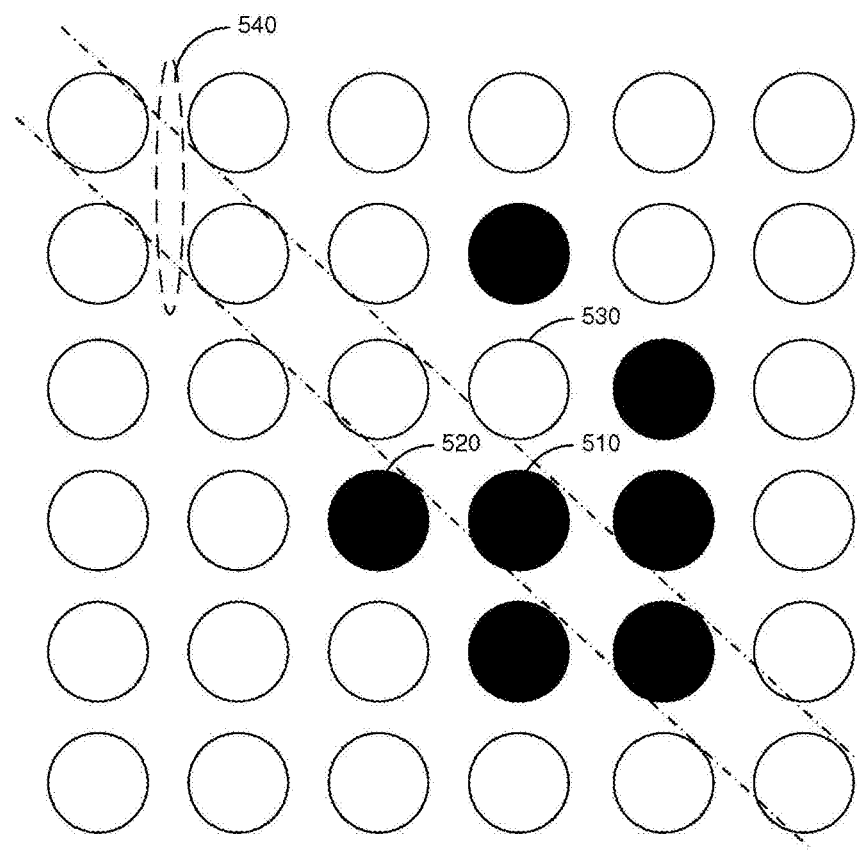
FIG. 5 is a diagram illustrating an exemplary approach of padding for IntraBC in video compression in accordance with an implementation of the present disclosure.
Figure 6:
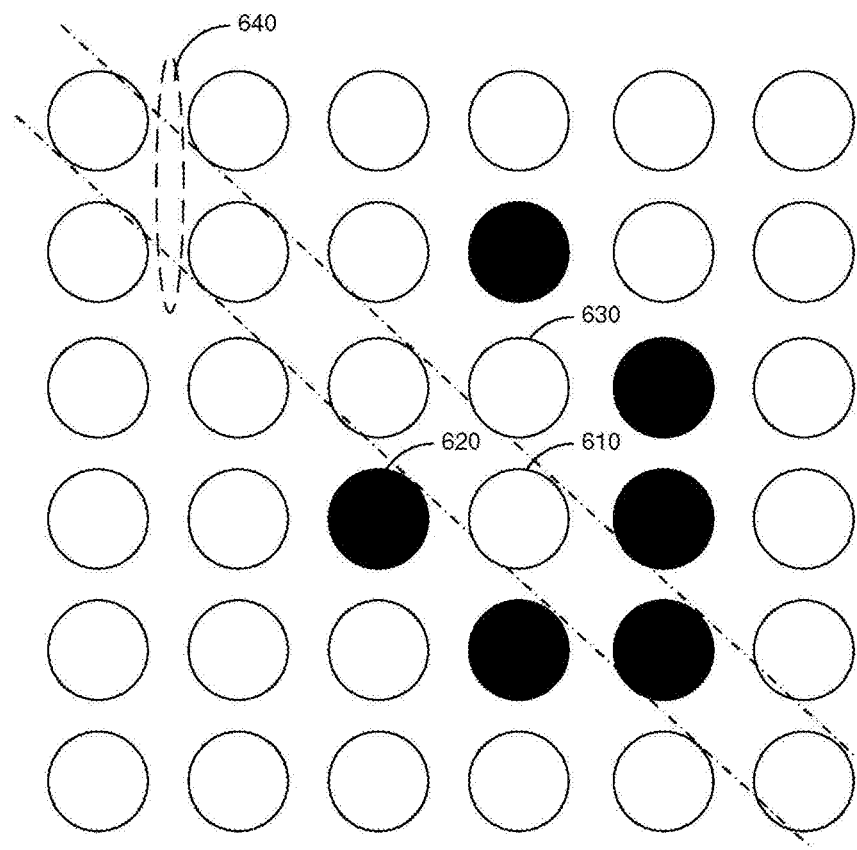
FIG. 6 is a diagram illustrating an exemplary approach of padding for IntraBC in video compression in accordance with another implementation of the present disclosure.
Figure 7:
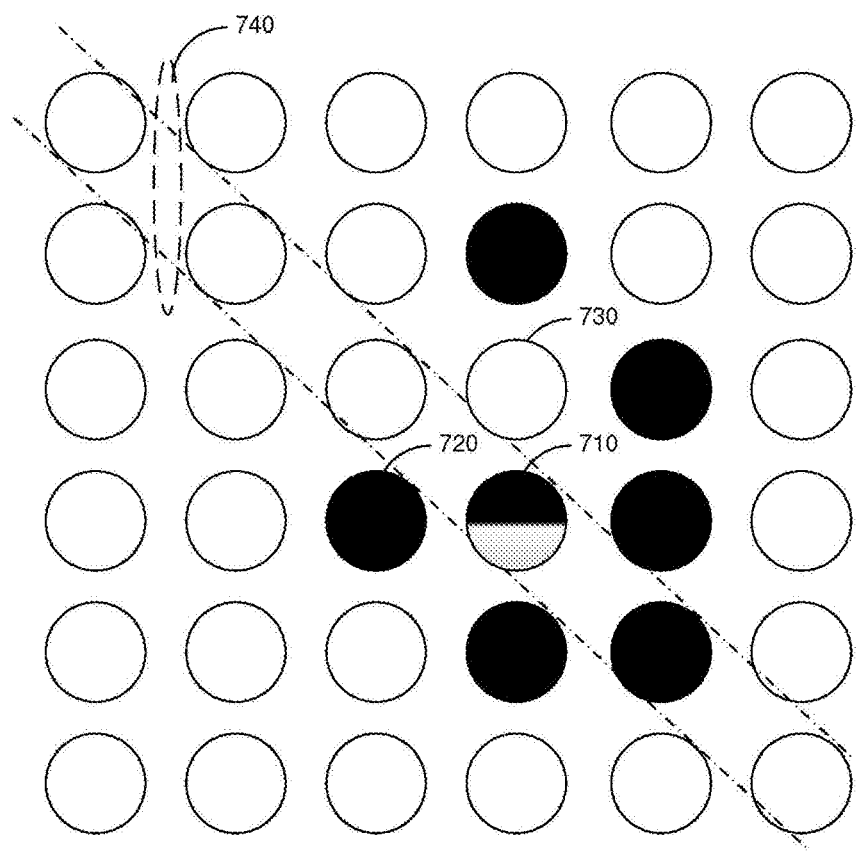
FIG. 7 is a diagram illustrating an exemplary approach of padding for IntraBC in video compression in accordance with yet another implementation of the present disclosure.

In some implementations, values of the pixels on the division line between two portions of the overlapped region may be set to be an average result of horizontal and vertical padding (for which an exemplary illustration is shown in FIG. 7). For example, the padding value of a given pixel on the division line may be the average of the value of its horizontal reference pixel from the left and the value of its vertical reference pixel from the top. Alternatively, values of the pixels on the division line are set to be the value of the pixel from either horizontal padding (for which an exemplary illustration is shown in FIG. 5) or vertical padding (for which an exemplary illustration is shown in FIG. 6).

In some implementations, in the upper or upper-right portion of the overlapped region, values of the pixel may gradually change from that of the reference sample pixels (e.g., the bottom-most row of pixels in the reference block immediately adjacent to the upper boundary of the overlapped region) to that of the pixel on the division line between the two portions of the overlapped region.

In the example shown in FIG. 4, R(0, 0), R(0, y) and R(x, 0) are the reference pixels. A given pixel in the overlapped region, having a size of N pixels by M pixels, may be denoted as P(x, y), where x=1, 2, ... N and y=1, 2, ... M. As shown in FIG. 4, P(x, y) is a pixel on the division line, and R(0,y) and R(x, 0) are reference sample pixels used for horizontal padding and vertical padding for P(x, y), respectively.

In some implementations, the value of pixel P(x, y) may be expressed by Equation (5) as follows: P(x, y)=(R(0, y)+R(x, 0))/2. For a pixel P(x, y') in the upper-right portion of the overlapped region, P(x, y')=P(x, y)+(1−α)*(R(x, 0)−P(x, y)), where α∈[0, 1]. Here, the parameter α may be a linear function of y', such as α=y'/y.

In some other implementations, the value of pixel P(x, y) may be expressed by Equation (6) as follows: P(x, y)=R(x, 0), P(x, y')=R(x, 0)+α *(R(0, y)−R(0, 0)). Here, the parameter α may also be a linear function of y', such as α=y'/y.

FIG. 5 is a diagram illustrating an exemplary approach 500 of padding for IntraBC in video compression in accordance with an implementation of the present disclosure.

FIG. 5 shows a number of pixels in an overlapped region between a reference block and a current block that requires padding for IntraBC. In the example shown in FIG. 5, the overlapped region is split or otherwise divided by a division line 540, e.g., into a lower-left portion and an upper-right portion. A number of pixels are on the division line, including pixel 510. Pixel 510 is surrounded by eight neighboring pixels, including a pixel 520 located in the lower-left portion of the overlapped region and a pixel 530 located in the upper-right portion of the overlapped region. Pixel 520 is at a location horizontal to the location of pixel 510, i.e., to the left of pixel 510. Pixel 530 is at a location vertical to the location of pixel 510, i.e., to the above of pixel 510.

In exemplary approach 500, a value of pixel 510 may be equal to a value of pixel 520.

FIG. 6 is a diagram illustrating an exemplary approach 600 of padding for IntraBC in video compression in accordance with another implementation of the present disclosure.

FIG. 6 shows a number of pixels in an overlapped region between a reference block and a current block that requires padding for IntraBC. In the example shown in FIG. 6, the overlapped region is split or otherwise divided by a division line 640, e.g., into a lower-left portion and an upper-right portion. A number of pixels are on the division line, including pixel 610. Pixel 610 is surrounded by eight neighboring pixels, including a pixel 620 located in the lower-left portion of the overlapped region and a pixel 630 located in the upper-right portion of the overlapped region. Pixel 620 is at a location horizontal to the location of pixel 610, i.e., to the left of pixel 610. Pixel 630 is at a location vertical to the location of pixel 610, i.e., to the above of pixel 610.

In exemplary approach 600, a value of pixel 610 may be equal to a value of pixel 630.

FIG. 7 is a diagram illustrating an exemplary approach 700 of padding for IntraBC in video compression in accordance with yet another implementation of the present disclosure.

FIG. 7 shows a number of pixels in an overlapped region between a reference block and a current block that requires padding for IntraBC. In the example shown in FIG. 7, the overlapped region is split or otherwise divided by a division line 740, e.g., into a lower-left portion and an upper-right portion. A number of pixels are on the division line, including pixel 710. Pixel 710 is surrounded by eight neighboring pixels, including a pixel 720 located in the lower-left portion of the overlapped region and a pixel 730 located in the upper-right portion of the overlapped region. Pixel 720 is at a location horizontal to the location of pixel 710, i.e., to the left of pixel 710. Pixel 730 is at a location vertical to the location of pixel 710, i.e., to the above of pixel 710.

In exemplary approach 700, a value of pixel 710 may be equal to an average or a weighted sum of a value of pixel 720 and a value of pixel 730.

In another approach, the overlapped region is not divided into portions, and each of the pixel values in the overlapped region is calculated based on one or more of the reconstructed pixel values of the reference block. For example, each of the pixel values in the overlapped region can be calculated as a weighted sum of a corresponding upper pixel value and a corresponding left pixel value, with both corresponding pixels in the reference block, and each of the weighting factors determined according to the distance between the corresponding pixel in the reference block and the to-be-padded pixel in the overlapped region.

Example Implementations

Figure 8:
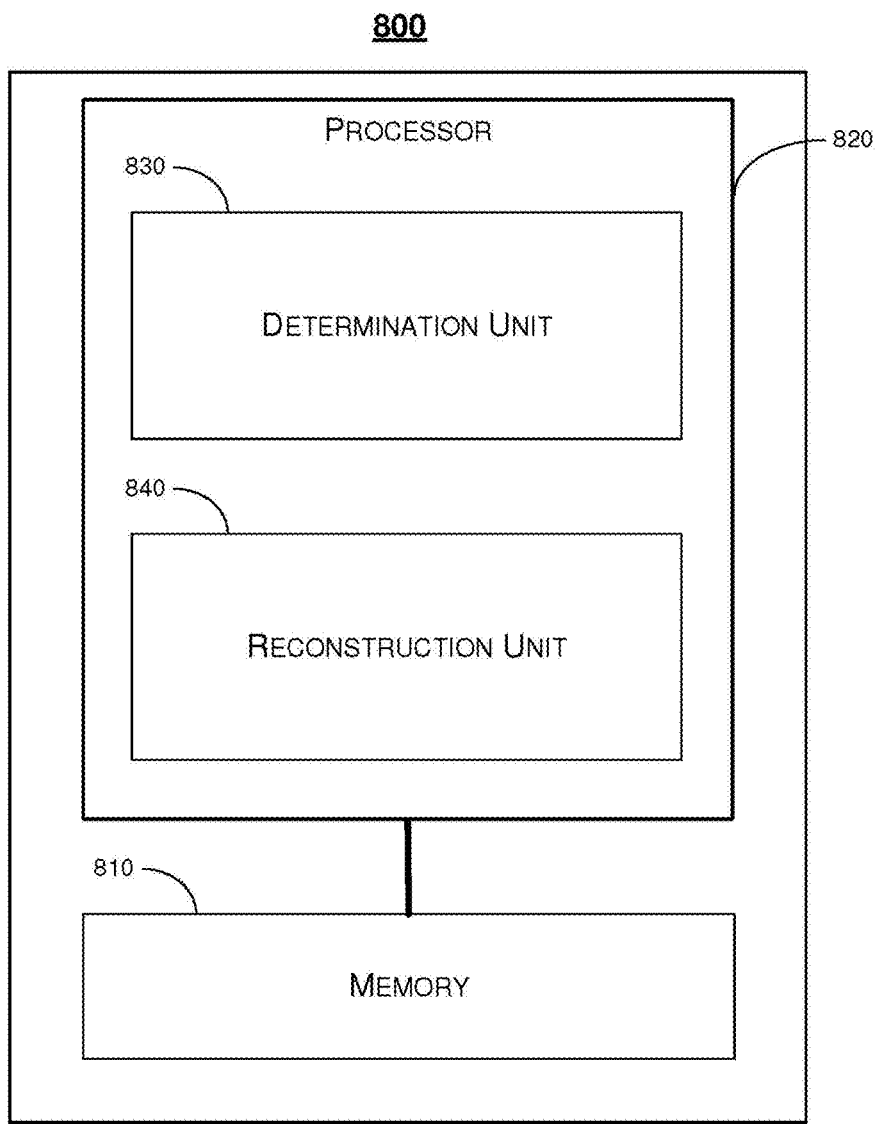
FIG. 8 is a block diagram of an exemplary video compression device in accordance with an implementations of the present disclosure.

FIG. 8 is a block diagram of an exemplary video compression device 800 in accordance with an implementations of the present disclosure.

Exemplary device 800 may perform various functions related to techniques, methods and approaches described herein, including example processes 900 described below and variations thereof. Exemplary device 800 may include a video encoder, a video decoder, or both a video encoder and a video decoder, and exemplary device 800 may be capable of performing video coding/video compression in compliance with HEVC. Exemplary device 800 may be implemented in the form of an integrated circuit (IC), a single chip, multiple chips or a chip set or an assembly of one or more chips and a printed circuit board (PCB).

Exemplary device 800 may include at least those components shown in FIG. 8, such as a memory 810, a processor 820, a determination unit 830 and a reconstruction unit 840. Either or both of determination unit 830 and reconstruction unit 840 may be implemented by hardware, software, firmware, middleware or any combination thereof. In some implementations, components of exemplary device 800 are made of physical electronic components such as, for example, transistors, resistors and capacitors.

Memory 810 may be configured to store data related to a plurality of pixels of a picture.

Processor 820 may be configured to store the data in and access the data from the memory 810. Processor 820 may include determination unit 830 and reconstruction unit 840.

Determination unit 830 may be configured to identify a first block of pixels of the plurality of pixels of the picture as a reference block for padding or otherwise reconstructing a second block of pixels of the plurality of pixels of the picture. Determination unit 830 may be further configured to determine an overlapped region of the second block that overlaps with the first block. For example, determination unit 830 may identify reference block 110, 210 or 310 as the reference block for padding or otherwise reconstructing current block 120, 220 or 320, respectively, and determine there is an overlapped region 130, 230 or 330 in block 120, 220 or 320 that overlaps with reference block 110, 210 or 310, respectively.

Reconstruction unit 840 may be configured to pad or otherwise reconstruct pixels in a first portion of the overlapped region based at least in part on a first set of pixels of the first block and to pad or otherwise reconstruct pixels in the second portion of the overlapped region based at least in part on a second set of pixels of the first block different from the first set of pixels of the first block. For example, reconstruction unit 840 may pad or otherwise reconstruct pixels in the lower-left portion of overlapped region 130, 230 or 330 based at least in part on the right-most column of pixels in reference block 110, 210 or 310 immediately adjacent to overlapped region 130, 230 or 330. Reconstruction unit 840 may also pad or otherwise reconstruct pixels in the upper-right portion of overlapped region 130, 230 or 330 based at least in part on the bottom-most row of pixels in reference block 110, 210 or 310 immediately adjacent to overlapped region 130, 230 or 330.

In at least some implementations, reconstruction unit 840 may be further configured to split the overlapped region into the first and second portions. For example, with reference to FIG. 1 and description thereof, reconstruction unit 840 may determine a block vector that indicates a spatial relationship between the first block and the second block. The block vector may point from a first corner on a first side of the overlapped region of the second block to a corresponding corner of the first block. Reconstruction unit 840 may also divide the overlapped region into the first and second portions by a line that is parallel to the block vector and extends from the first corner of the overlapped region of the second block to a second side of the overlapped region opposite the first side of the overlapped region.

In at least some implementations, with reference to FIG. 2 and description thereof, reconstruction unit 840 may be further configured to split the overlapped region into the first and second portions by dividing the overlapped region into the first and second portions by a line that diagonally dissects the overlapped region from a first corner of the overlapped region to a second corner of the overlapped region diagonal to the first corner.

In at least some implementations, with reference to FIG. 3 and description thereof, reconstruction unit 840 may be further configured to split the overlapped region into the first and second portions by determining a splitting direction, determining an intersection point on a first boundary of the overlapped region, and dividing the overlapped region into the first and second portions by a line extending in the splitting direction and intersecting the first boundary of the overlapped region at the intersection point. The splitting direction may include a direction of a block vector that indicates a spatial relationship between the first block and the second block or a direction of a gradient of a number of pixels of the first block in proximity of the intersection point. In determining the intersection point, reconstruction unit 840 may be configured to determine a pixel difference between every two neighboring pixels of the point or determining a pixel gradient distribution of reconstructed pixels around the point for each point on the first boundary of the overlapped region and a second boundary of the overlapped region orthogonal to the first boundary. Reconstruction unit 840 may also be configured to determine a first point as the intersection point. The pixel difference for the first point may be greater than the pixel different for each of other points on the first and second boundaries of the overlapped region or a magnitude of the pixel gradient for the first point is greater than a magnitude of the pixel gradient for each of other points on the first and second boundaries of the overlapped region.

In at least some implementations, reconstruction unit 840 may be further configured to pad or otherwise reconstruct the pixels in the first portion of the overlapped region by performing one of two tasks. For example, reconstruction unit 840 may duplicate the first set of pixels of the first block, which are adjacent to the first portion of the overlapped region, for the pixels in the first portion of the overlapped region. Alternatively, reconstruction unit 840 may pad or otherwise reconstruct the pixels in the first portion of the overlapped region based on the first set of pixels of the first block, which are adjacent to the first portion of the overlapped region, such that values of the reconstructed pixels in the first portion change in a direction from a border of the overlapped region adjacent to the first set of pixels of the first block to a division line between the first portion and the second portion of the overlapped region.

In at least some implementations, reconstruction unit 840 may be further configured to pad or otherwise reconstruct the pixels in the second portion of the overlapped region by performing one of two tasks. For example, reconstruction unit 840 may duplicate the second set of pixels of the first block, which are adjacent to the second portion of the overlapped region, for the pixels in the second portion of the overlapped region. Alternatively, reconstruction unit 840 may pad or otherwise reconstruct the pixels in the second portion of the overlapped region based on the second set of pixels of the first block, which are adjacent to the second portion of the overlapped region, such that values of the reconstructed pixels in the second portion change in a direction from a border of the overlapped region adjacent to the second set of pixels of the first block to a division line between the first portion and the second portion of the overlapped region.

In at least some implementations, a value of a first reconstructed pixel on a division line between the first portion and the second portion of the overlapped region may be equal to one of the following: (1) an average of a value of a second reconstructed pixel in the first portion of the overlapped region and adjacent to the first reconstructed pixel and a value of a third reconstructed pixel in the second portion of the overlapped region and adjacent to the first reconstructed pixel, similar to that shown in FIG. 7 and the description thereof; (2) a value of a second reconstructed pixel in the first portion of the overlapped region and adjacent to the first reconstructed pixel, similar to that shown in FIG. 5 and the description thereof; or (3) a value of a third reconstructed pixel in the second portion of the overlapped region and adjacent to the first reconstructed pixel, similar to that shown in FIG. 6 and the description thereof.

Figure 9:
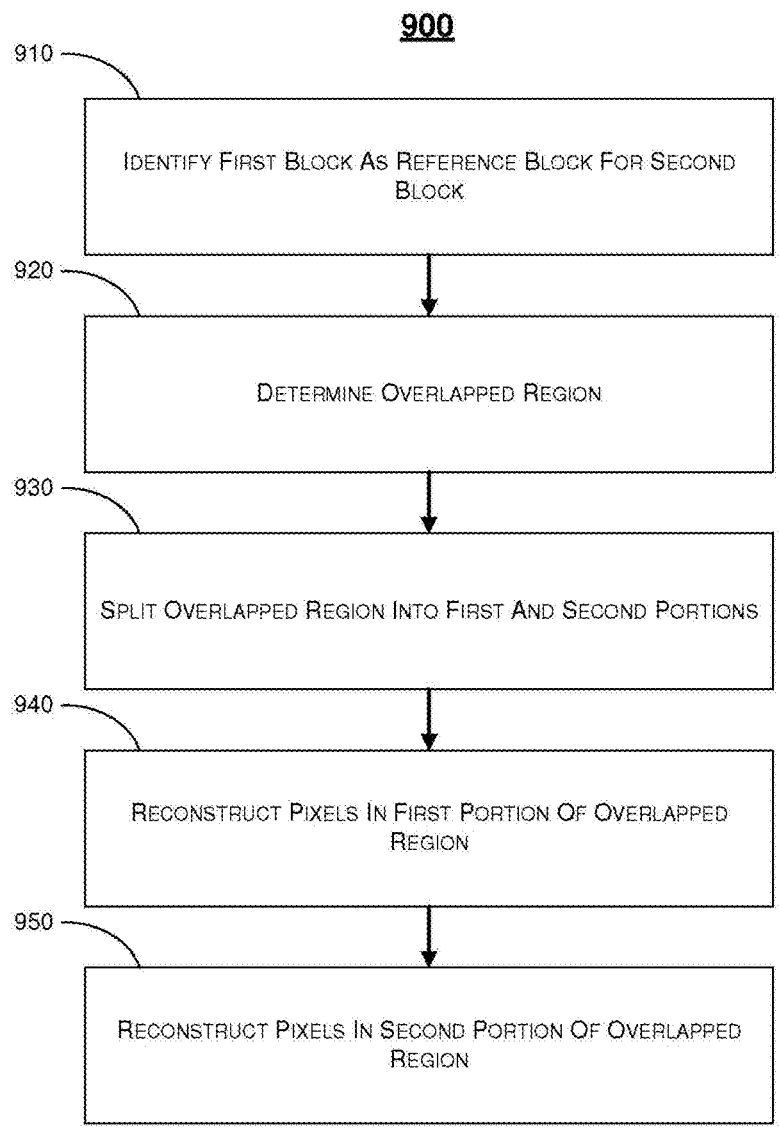
FIG. 9 is a flowchart of an exemplary process of IntraBC in video compression in accordance with an implementation of the present disclosure.

FIG. 9 is a flowchart of an exemplary process 900 of IntraBC in video compression in accordance with an implementation of the present disclosure. Exemplary process 900 may include one or more operations, actions, or functions as illustrated by one or more of blocks 910, 920, 930, 940 and 950. Although illustrated as discrete blocks, various blocks may be divided into additional blocks, combined into fewer blocks, or eliminated, depending on the desired implementation. Exemplary process 900 may be implemented by processor 520 of exemplary device 500. For illustrative purposes, the operations described below are performed by processor 820 of exemplary device 800. Exemplary process 900 may begin at block 910.

Block 910 (Identify First Block As Reference Block For Second Block) may involve processor 820 of exemplary device 800 identifying a first block of pixels of a plurality of pixels of a picture as a reference block for padding or otherwise reconstructing a second block of pixels of the plurality of pixels of the picture. Block 910 may be followed by block 920.

Block 920 (Determine Overlapped Region) may involve processor 820 of exemplary device 800 determining an overlapped region of the second block that overlaps with the first block. Block 920 may be followed by block 930.

Block 930 (Split Overlapped Region Into First And Second Portions) may involve processor 820 of exemplary device 800 splitting the overlapped region into a first portion and a second portion. Block 930 may be followed by block 940.

Block 940 (Reconstruct Pixels In First Portion Of Overlapped Region) may involve processor 820 of exemplary device 800 padding or otherwise reconstructing pixels in the first portion of the overlapped region based at least in part on a first set of pixels of the first block. Block 940 may be followed by block 950.

Block 950 (Reconstruct Pixels In Second Portion Of Overlapped Region) may involve processor 820 of exemplary device 800 padding or otherwise reconstructing pixels in the second portion of the overlapped region based at least in part on a second set of pixels of the first block different from the first set of pixels of the first block.

In at least some implementations, in splitting the overlapped region, example process 900 may involve processor 820 of exemplary device 800 determining a block vector that indicates a spatial relationship between the first block and the second block, the block vector pointing from a first corner on a first side of the overlapped region of the second block to a corresponding corner of the first block. Exemplary process 900 may also involve processor 820 of exemplary device 800 dividing the overlapped region into the first and second portions by a line that is parallel to the block vector and extends from the first corner of the overlapped region of the second block to a second side of the overlapped region opposite the first side of the overlapped region.

In at least some implementations, in splitting the overlapped region, exemplary process 900 may involve processor 820 of exemplary device 800 dividing the overlapped region into the first and second portions by a line that diagonally dissects the overlapped region from a first corner of the overlapped region to a second corner of the overlapped region diagonal to the first corner.

In at least some implementations, in splitting the overlapped region, exemplary process 900 may involve processor 820 of exemplary device 800 determining a splitting direction, determining an intersection point on a first boundary of the overlapped region, and dividing the overlapped region into the first and second portions by a line extending in the splitting direction and intersecting the first boundary of the overlapped region at the intersection point.

In at least some implementations, the splitting direction may include a direction of a block vector that indicates a spatial relationship between the first block and the second block or a direction of a gradient of a number of pixels of the first block in proximity of the intersection point.

In at least some implementations, in determining the intersection point, exemplary process 900 may involve processor 820 of exemplary device 800 determining a pixel difference between every two neighboring pixels of the point for each point on the first boundary of the overlapped region and a second boundary of the overlapped region orthogonal to the first boundary. Exemplary process 900 may also involve processor 820 of exemplary device 800 determining a first point as the intersection point. The pixel difference for the first point may be greater than the pixel different for each of other points on the first and second boundaries of the overlapped region.

In at least some implementations, in determining the intersection point, exemplary process 900 may involve processor 820 of exemplary device 800 determining a pixel gradient distribution of reconstructed pixels around the point for each point on the first boundary of the overlapped region and a second boundary of the overlapped region orthogonal to the first boundary. Exemplary process 900 may also involve processor 820 of exemplary device 800 determining a first point as the intersection point, wherein a magnitude of the pixel gradient for the first point is greater than a magnitude of the pixel gradient for each of other points on the first and second boundaries of the overlapped region.

In at least some implementations, exemplary process 900 may also involve processor 820 of exemplary device 800 padding or otherwise reconstructing pixels in the first portion of the overlapped region based at least in part on the first set of pixels of the first block comprises duplicating the first set of pixels of the first block, which are adjacent to the first portion of the overlapped region, for the pixels in the first portion of the overlapped region. Exemplary process 900 may further involve processor 820 of exemplary device 800 padding or otherwise reconstructing pixels in the second portion of the overlapped region based at least in part on the second set of pixels of the first block comprises duplicating the second set of pixels of the first block, which are adjacent to the second portion of the overlapped region, for the pixels in the second portion of the overlapped region.

In at least some implementations, exemplary process 900 may also involve processor 820 of exemplary device 800 padding or otherwise reconstructing pixels in the first portion of the overlapped region based at least in part on the first set of pixels of the first block comprises padding or otherwise reconstructing the pixels in the first portion of the overlapped region based on the first set of pixels of the first block, which are adjacent to the first portion of the overlapped region, such that values of the reconstructed pixels in the first portion change in a direction from a border of the overlapped region adjacent to the first set of pixels of the first block to a division line between the first portion and the second portion of the overlapped region. Exemplary process 900 may further involve processor 820 of exemplary device 800 padding or otherwise reconstructing pixels in the second portion of the overlapped region based at least in part on the second set of pixels of the first block comprises padding or otherwise reconstructing the pixels in the second portion of the overlapped region based on the second set of pixels of the first block, which are adjacent to the second portion of the overlapped region, such that values of the reconstructed pixels in the second portion change in a direction from a border of the overlapped region adjacent to the second set of pixels of the first block to a division line between the first portion and the second portion of the overlapped region.

In at least some implementations, a value of a first reconstructed pixel on a division line between the first portion and the second portion of the overlapped region may be equal to an average or a weighted sum of a value of a second reconstructed pixel in the first portion of the overlapped region and adjacent to the first reconstructed pixel and a value of a third reconstructed pixel in the second portion of the overlapped region and adjacent to the first reconstructed pixel.

In at least some implementations, a value of a first reconstructed pixel on a division line between the first portion and the second portion of the overlapped region may be equal to a value of a second reconstructed pixel in the first portion of the overlapped region and adjacent to the first reconstructed pixel.

In at least some implementations, a value of a first reconstructed pixel on a division line between the first portion and the second portion of the overlapped region may be equal to a value of a third reconstructed pixel in the second portion of the overlapped region and adjacent to the first reconstructed pixel.

In at least some implementations, exemplary process 900 may also involve processor 820 of exemplary device 800 encoding the plurality of pixels of the picture.

In at least some implementations, exemplary process 900 may also involve processor 820 of exemplary device 800 decoding the plurality of pixels of the picture.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method of intra picture block copy in video compression, comprising:
    identifying a first block of pixels of a picture as a reference block for reconstructing a second block of pixels of the picture;
    determining an overlapped region of the second block that overlaps with the first block, the first block having a first corner, and the second block having a second corner corresponding to the first corner and overlapping the first block;
    splitting the overlapped region into a first portion and a second portion along a division line that is parallel to a block vector or a diagonal line of the overlapped region, the block vector indicating a spatial relationship between the first corner of the first block and the second corner of the second block, and the diagonal line of the overlapped region being defined based on a third corner of the overlapped region that is at a same position as the second corner of the second block;
    reconstructing pixels in the first portion of the overlapped region based on a first set of pixels of the first block in a manner that values of the reconstructed pixels in the first portion change in a direction from a border of the overlapped region adjacent to the first set of pixels of the first block to the division line; and
    reconstructing pixels in the second portion of the overlapped region based on a second set of pixels of the first block in a manner that values of the reconstructed pixels in the second portion change in a direction from a border of the overlapped region adjacent to the second set of pixels of the first block to the division line, wherein the first set of pixels of the first block is adjacent to the first portion of the overlapped region, and the second set of pixels of the first block is adjacent to the second portion of the overlapped region.

2. The method of claim 1, further comprising determining a value of a first reconstructed pixel that is on the division line according to an average or a weighted sum of a value of a first pixel in the first set of pixels of the first block and a value of a second pixel in the second set of pixels of the first block.

3. The method of claim 1, wherein
the block vector points from the second corner of the second block to the first corner of the first block,
the division line is parallel to the block vector, and
the third corner of the overlapped region is on the division line.

4. The method of claim 1, wherein
the division line diagonally dissects the overlapped region from the third corner of the overlapped region to a fourth corner of the overlapped region diagonal to the third corner.

5. The method of claim 1, wherein the splitting the overlapped region comprises:
determining a splitting direction based on the block vector or the diagonal line of the overlapped region;
determining an intersection point on a first boundary of the overlapped region; and
dividing the overlapped region into the first and second portions by the division line extending in the splitting direction and intersecting the first boundary of the overlapped region at the intersection point.

6. The method of claim 5, wherein the determining the intersection point comprises:
for each point on the first boundary of the overlapped region and a second boundary of the overlapped region orthogonal to the first boundary, determining a pixel difference between every two neighboring pixels of the point; and
determining a first point as the intersection point, wherein the pixel difference for the first point is greater than the pixel different for each of other points on the first and second boundaries of the overlapped region.

7. The method of claim 5, wherein the determining the intersection point comprises:
for each point on the first boundary of the overlapped region and a second boundary of the overlapped region orthogonal to the first boundary, determining a pixel gradient distribution of reconstructed pixels around the point; and
determining a first point as the intersection point, wherein a magnitude of the pixel gradient for the first point is greater than a magnitude of the pixel gradient for each of other points on the first and second boundaries of the overlapped region.

8. The method of claim 1, further comprising determining a value of a first reconstructed pixel on the division line according to an average or a weighted sum of a value of a second reconstructed pixel in the first portion of the overlapped region and adjacent to the first reconstructed pixel and a value of a third reconstructed pixel in the second portion of the overlapped region and adjacent to the first reconstructed pixel.

9. The method of claim 1, further comprising:
encoding the second block of pixels of the picture based on the reconstructed pixels in first and second portions of the overlapped region.

10. The method of claim 1, further comprising:
decoding the second block of pixels of the picture based on the reconstructed pixels in first and second portions of the overlapped region.

11. A device capable of intra picture block copy in video compression, the device comprising:
a memory configured to store data related to a picture; and
a processor coupled with the memory and configured to:
identify a first block of pixels of the picture as a reference block for reconstructing a second block of pixels of the picture;
determine an overlapped region of the second block that overlaps with the first block, the first block having a first corner, and the second block having a second corner corresponding to the first corner and overlapping the first block;
split the overlapped region into a first portion and a second portion along a division line that is parallel to a block vector or a diagonal line of the overlapped region, the block vector indicating a spatial relationship between the first corner of the first block and the second corner of the second block, and the diagonal line of the overlapped region being defined based on a third corner of the overlapped region that is at a same position as the second corner of the second block;
reconstruct pixels in the first portion of the overlapped region based on a first set of pixels of the first block such that values of the reconstructed pixels in the first portion change in a direction from a boarder of the overlapped region adjacent to the first set of pixels of the first block to the division line; and
reconstruct pixels in the second portion of the overlapped region based on a second set of pixels of the first block such that values of the reconstructed pixels in the second portion change in a direction from a border of the overlapped region adjacent to the second set of pixels of the first block to the division line,
wherein the first set of pixels of the first block is adjacent to the first portion of the overlapped region, and the second set of pixels of the first block is adjacent to the second portion of the overlapped region.

12. The device of claim 11, wherein
the block vector points from the second corner of the second block to the first corner of the first block,
the division line is parallel to the block vector, and
the third corner of the overlapped region is on the division line.

13. The device of claim 11, wherein
the division line diagonally dissects the overlapped region from the third corner of the overlapped region to a fourth corner of the overlapped region diagonal to the third corner.

14. The device of claim 11, wherein the processor is further configured to:
determine a splitting direction based on the block vector or the diagonal line of the overlapped region;
determine an intersection point on a first boundary of the overlapped region; and
divide the overlapped region into the first and second portions by the division line extending in the splitting direction and intersecting the first boundary of the overlapped region at the intersection point.

15. The device of claim 11, wherein the processor is further configured to:
   determine a value of a first reconstructed pixel on the division line according to an average or a weighted sum of a value of a second reconstructed pixel in the first portion of the overlapped region and adjacent to the first reconstructed pixel and a value of a third reconstructed pixel in the second portion of the overlapped region and adjacent to the first reconstructed pixel.

16. The device of claim 14, wherein the processor is further configured to:
   for each point on the first boundary of the overlapped region and a second boundary of the overlapped region orthogonal to the first boundary, determine a pixel difference between every two neighboring pixels of the point; and
   determine a first point as the intersection point, wherein the pixel difference for the first point is greater than the pixel different for each of other points on the first and second boundaries of the overlapped region.

17. The device of claim 14, wherein the processor is further configured to:
   for each point on the first boundary of the overlapped region and a second boundary of the overlapped region orthogonal to the first boundary, determine a pixel gradient distribution of reconstructed pixels around the point; and
   determine a first point as the intersection point, wherein a magnitude of the pixel gradient for the first point is greater than a magnitude of the pixel gradient for each of other points on the first and second boundaries of the overlapped region.

* * * * *